United States Patent
Crews et al.

(10) Patent No.: US 8,445,414 B2
(45) Date of Patent: May 21, 2013

(54) COMPOSITIONS AND METHODS FOR CONTROLLING FLUID LOSS

(75) Inventors: James B. Crews, Willis, TX (US); Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/364,944

(22) Filed: Feb. 2, 2012

(65) Prior Publication Data
US 2012/0135896 A1 May 31, 2012

Related U.S. Application Data

(62) Division of application No. 11/754,656, filed on May 29, 2007, now Pat. No. 8,114,820.

(60) Provisional application No. 60/815,693, filed on Jun. 22, 2006.

(51) Int. Cl.
*C09K 8/08* (2006.01)
*E21B 43/12* (2006.01)

(52) U.S. Cl.
USPC .......... 507/271; 507/240; 507/244; 507/245; 507/260; 507/263; 507/265; 507/269; 507/270; 507/272; 507/275; 166/280.1; 166/282; 166/305.1; 166/308.2; 166/308.3

(58) Field of Classification Search
None
See application file for complete search history.

(56) References Cited

U.S. PATENT DOCUMENTS

| | | |
|---|---|---|
| 3,872,018 A | 3/1975 | Alexander |
| 4,620,596 A | 11/1986 | Mondshine |
| 4,735,731 A | 4/1988 | Rose et al. |
| 4,931,195 A | 6/1990 | Cao et al. |
| 5,807,812 A | 9/1998 | Smith et al. |
| 5,858,928 A | 1/1999 | Aubert et al. |
| 5,964,295 A | 10/1999 | Brown et al. |
| 6,211,120 B1 | 4/2001 | Welch et al. |
| 6,342,467 B1 | 1/2002 | Chang et al. |
| 6,613,720 B1 | 9/2003 | Feraud et al. |
| 6,631,764 B2 | 10/2003 | Parlar et al. |
| 6,762,154 B2 | 7/2004 | Lungwitz et al. |

(Continued)

FOREIGN PATENT DOCUMENTS
WO 2008036812 A2 3/2008

OTHER PUBLICATIONS

Halliburton, "K-Max-Plus™ Service," Product Bulletin, Dec. 2005.

*Primary Examiner* — John J Figueroa
(74) *Attorney, Agent, or Firm* — Mossman Kumar & Tyler PC

(57) ABSTRACT

Alkaline earth metal compounds may be fluid loss control (FLC) agents for viscoelastic surfactant (VES) fluids used for fluid loss control pills, lost circulation material pills and kill pills in hydrocarbon recovery operations. The FLC agents may include, but not be limited to oxides and hydroxides of alkaline earth metal, and in one case magnesium oxide where the particle size of the magnesium oxide is between 1 nanometer to 0.4 millimeter. The FLC agent may alternatively be transition metal oxides and/or transition metal hydroxides. The FLC agent appears to associate with the VES micelles and together form a novel pseudo-filter cake quasi-crosslinked viscous fluid layer that limits further VES fluid flow into the porous media. The FLC agent solid particles may be added along with VES fluids. The pills may also contain internal breakers to reduce the viscosity thereof so that the components of the pill may be recovered.

16 Claims, 6 Drawing Sheets

U.S. PATENT DOCUMENTS

| | | |
|---|---|---|
| 7,060,661 B2 | 6/2006 | Dobson et al. |
| 7,081,439 B2 | 7/2006 | Sullivan et al. |
| 7,207,388 B2 | 4/2007 | Samuel et al. |
| 7,226,896 B2 | 6/2007 | Audibert-Hayet et al. |
| 7,265,079 B2 | 9/2007 | Willberg et al. |
| 7,527,102 B2 | 5/2009 | Crews et al. |
| 7,544,643 B2 | 6/2009 | Huang |
| 8,114,820 B2 | 2/2012 | Crews et al. |
| 2003/0166471 A1 | 9/2003 | Samuel et al. |
| 2003/0234103 A1 | 12/2003 | Lee et al. |
| 2004/0106525 A1 | 6/2004 | Willberg et al. |
| 2005/0252658 A1 | 11/2005 | Willingham et al. |
| 2006/0041028 A1 | 2/2006 | Crews |
| 2006/0211775 A1 | 9/2006 | Crews |
| 2006/0211776 A1 | 9/2006 | Crews |
| 2006/0229212 A1 | 10/2006 | Willberg et al. |
| 2006/0272816 A1* | 12/2006 | Willberg et al. .............. 166/279 |
| 2007/0056737 A1 | 3/2007 | Crews et al. |
| 2007/0299142 A1 | 12/2007 | Crews et al. |
| 2008/0023201 A1 | 1/2008 | Huang et al. |
| 2008/0060812 A1 | 3/2008 | Huang et al. |
| 2008/0139419 A1 | 6/2008 | Huang |
| 2008/0248978 A1 | 10/2008 | Huang et al. |

* cited by examiner

COMPOSITIONS AND METHODS FOR CONTROLLING FLUID LOSS

CROSS-REFERENCE TO RELATED APPLICATION

This application is a divisional application from U.S. Ser. No. 11/754,656 filed May 29, 2007 that issued Feb. 14, 2012 as U.S. Pat. No. 8,114,820, which in turn claims the benefit of U.S. Provisional Application No. 60/815,693 filed Jun. 22, 2006.

TECHNICAL FIELD

The present invention relates to aqueous, viscoelastic fluids used during hydrocarbon recovery operations, and more particularly relates, in one embodiment, to methods for controlling the fluid losses using fluid loss control pills that contain viscoelastic surfactants, fluid loss control agents and internal breakers.

BACKGROUND

Fluid loss control (FLC) pills are commonly used in hydrocarbon recovery operations after every gravel pack and frac-pack (fracturing with a gravel pack) to reduce the amount of completion brine entering the treated production zone. Present FLC pill technology uses hydratable polymer-based viscous fluids. In some cases the viscous polymeric fluids may contain graded particulates such as ulexite, calcium carbonate, and the like as bridging or plugging agents. The FLC pills are typically removed (cleaned-up) from the wellbore by acids, oxidizers, enzymes, and other like degradation agents.

However, complete FLC pill removal that leaves very little to no formation, gravel, and/or proppant pack damage is often not achieved. Polymeric-based FLC pills often contain 3.0 to 5.0 lbs of polymer per gallon of LCM pill (about 0.4 to about 0.6 kg/liter), which is a significant amount of polymer to remove. A typical polymeric gelling agent may be a solvatable polysaccharide, which may or may not be crosslinked. In most cases, unbroken polymer and residue of broken polymer is left within the wellbore region which causes impaired production of the hydrocarbon bearing zone.

Viscoelastic surfactant (VES) fluids are known to be much less damaging to formations, gravel and proppant packs compared to polymeric fluids but are generally considered inadequate in performance for use as FLC pills. For example, many VES fluids readily leak into porous media with permeabilities greater that about 1 Darcy. For this reason attempts have been made to use graded size particles of polymer and/or inorganic compounds to aid in plugging the porous media to prevent completion brine loss to the production zone. However, the added polymer and/or other particulates are typically counterproductive in that they will also be difficult to remove and will cause formation and other near wellbore permeability damage.

It would be desirable if a new and robust VES fluid loss control pill could be devised that would inhibit or control fluid loss in a well, but that did not require the use of polymers or other materials that are difficult to remove or may cause near wellbore permeability damage.

SUMMARY

There is provided, in one form, a method for controlling fluid loss in a well that involves an aqueous fluid loss pill. The aqueous fluid loss control (FLC) pill includes an aqueous base fluid; a viscoelastic surfactant (VES) gelling agent in an amount that increases the viscosity of the aqueous base fluid, a fluid loss control (FLC) agent in an amount that improves the fluid loss as compared with an identical fluid absent the agent, and an internal breaker. A viscosity enhancer is optional. The FLC agent may be an alkaline earth metal oxide, alkaline earth metal hydroxide, transition metal oxide, transition metal hydroxide, and mixtures thereof. The FLC agent may also function as a viscosity stabilizer for the VES fluids at high temperatures. The viscosity enhancer may be piezoelectric crystal particles (which include pyroelectric crystal particles). The internal breaker may include, but is not necessarily limited to, transition metal ion sources, saponified fatty acids, mineral oils, hydrogenated polyalphaolefin oils, saturated fatty acids, unsaturated fatty acids, and combinations thereof. The method further involves injecting the aqueous FLC pill through a wellbore and to the subterranean formation.

There is further provided in another non-limiting embodiment a method for controlling fluid loss in a well that involves providing an aqueous FLC pill, where the FLC pill includes an aqueous brine base fluid, a VES gelling agent in an amount effective to increase the viscosity of the aqueous base fluid, from about 2 to about 200 pptg (about 0.2 to about 24 kg/m$^3$) FLC agent based on the aqueous FLC pill. Again, the FLC agent is present in an amount effective to improve the fluid loss as compared with an identical fluid absent the agent, where the agent may be one of those noted above. The FLC pill may also contain a viscosity enhancer, and an internal breaker such as those described above. The FLC pill may be injected through a wellbore to the subterranean formation. The FLC pill may be a kill pill that at least substantially reducing the flow of fluids into the wellbore. It is not necessary that the kill pill completely stop the flow of fluids into the wellbore to be considered effective, but this may be the case.

The viscosity enhancers (e.g. ZnO and/or AlPO$_4$, and the like) appear to increase the viscosity of VES fluids, when the fluid containing the viscosity enhancers is heated and/or placed under pressure, the particles develop surface charges that associate, link, connect, or relate the VES micelles thereby significantly increasing the viscosity of the fluid. The higher fluid viscosity is beneficial to increase flow resistance to control fluid loss. Additionally, the methods herein may be further advanced by use of nanometer-scale viscosity enhancers to flow in small pores of the hydrocarbon bearing zone with VES fluids to increase the viscosity of the fluids.

The fluid loss control agents (e.g. MgO and/or MgOH$_2$, and the like) appear to help develop a pseudo-filter cake of VES micelles by associating with them as well as ions and particles to produce a novel and unusual viscous fluid layer of pseudo-crosslinked elongated micelles on the reservoir face that limits further VES fluid leak-off. Additionally, the art may be further advanced by use of nanometer-sized fluid loss control agents that also form a similar viscous fluid layer of pseudo-crosslinked micelles on the formation face that are equivalent to micron-sized fluid loss control agents in controlling the rate of VES fluid loss, yet can be non-pore plugging and physically easier to produce back with the VES fluid after a FLC pill treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

Figure 2:
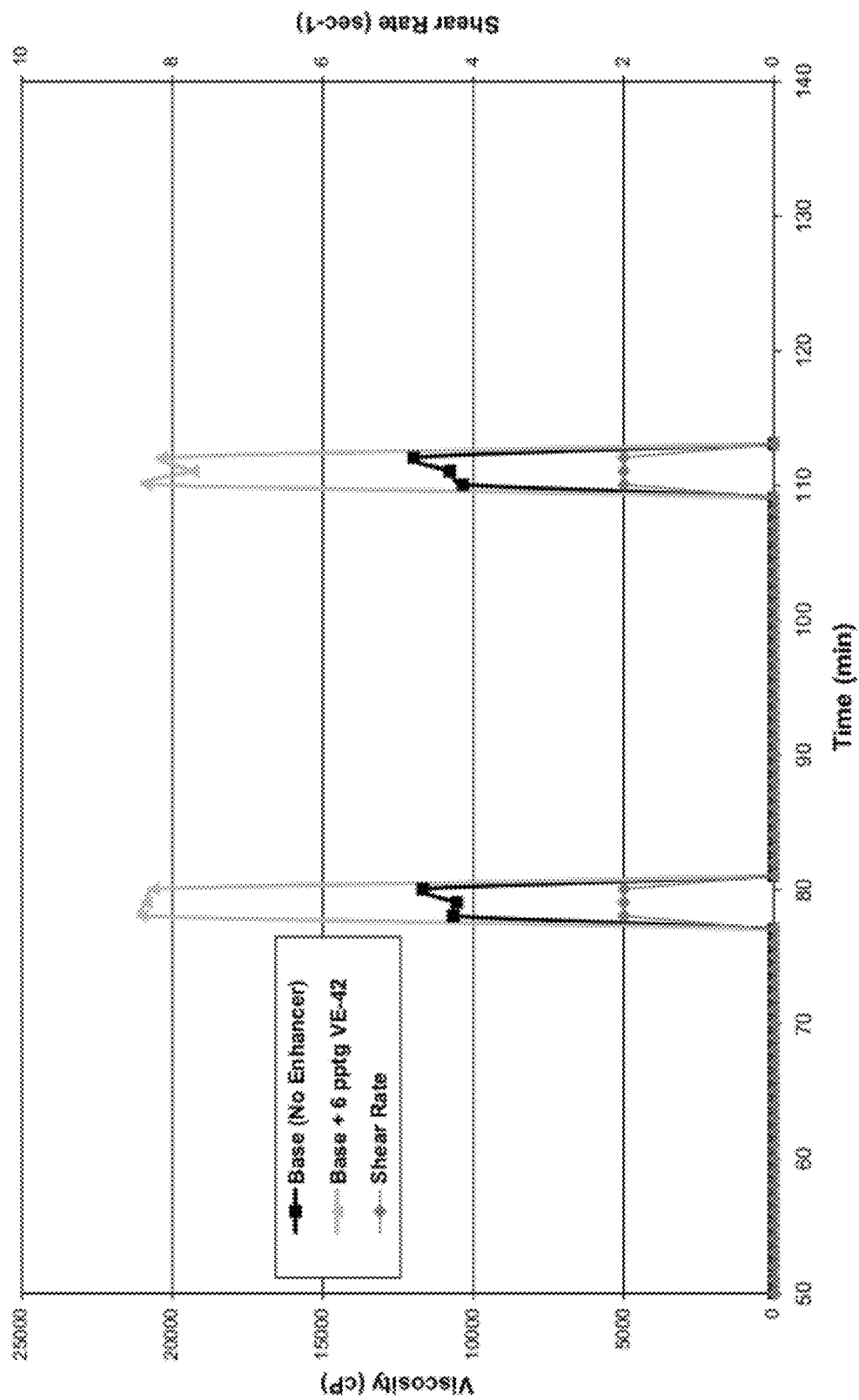
Figure 3:
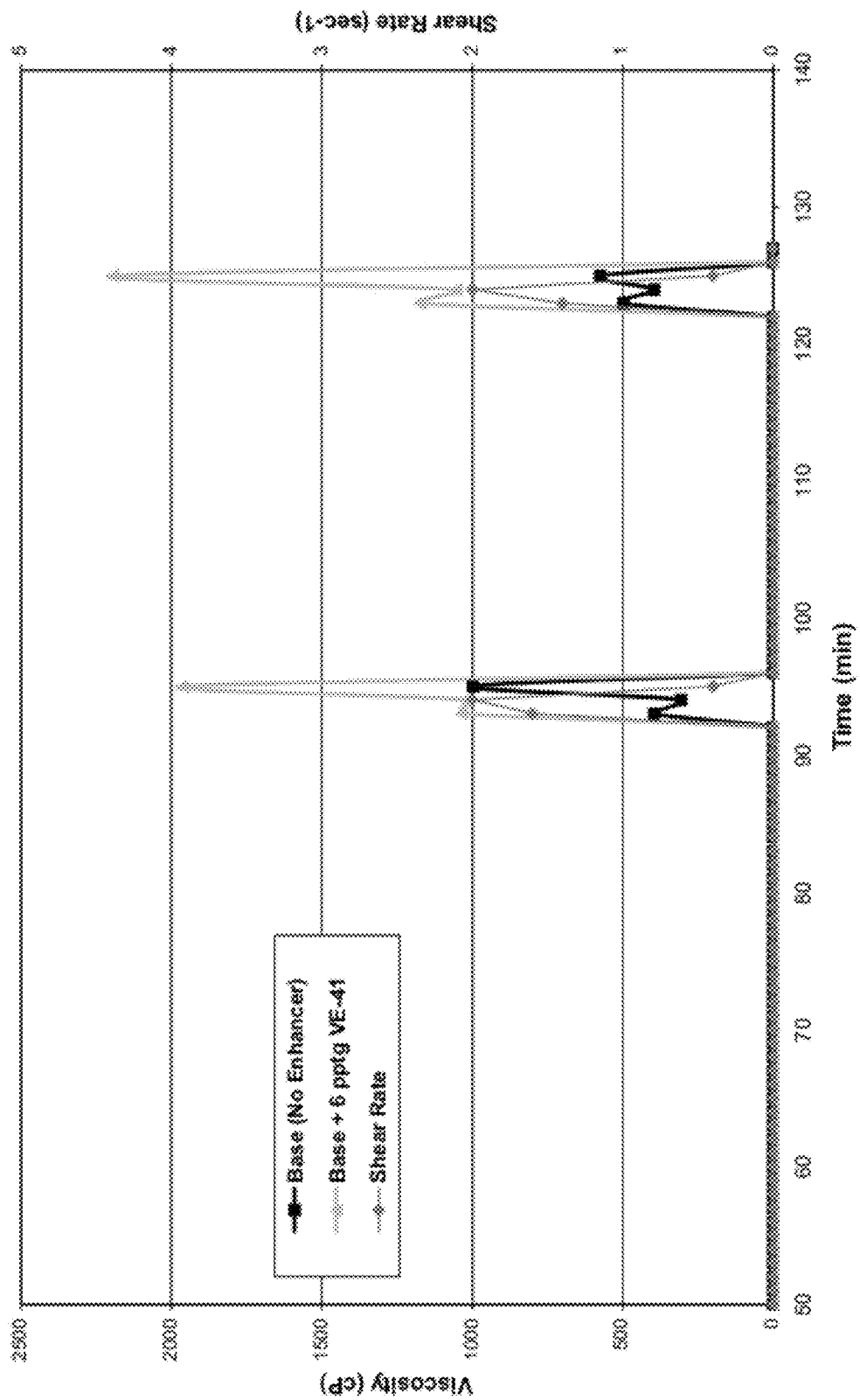
Figure 4:
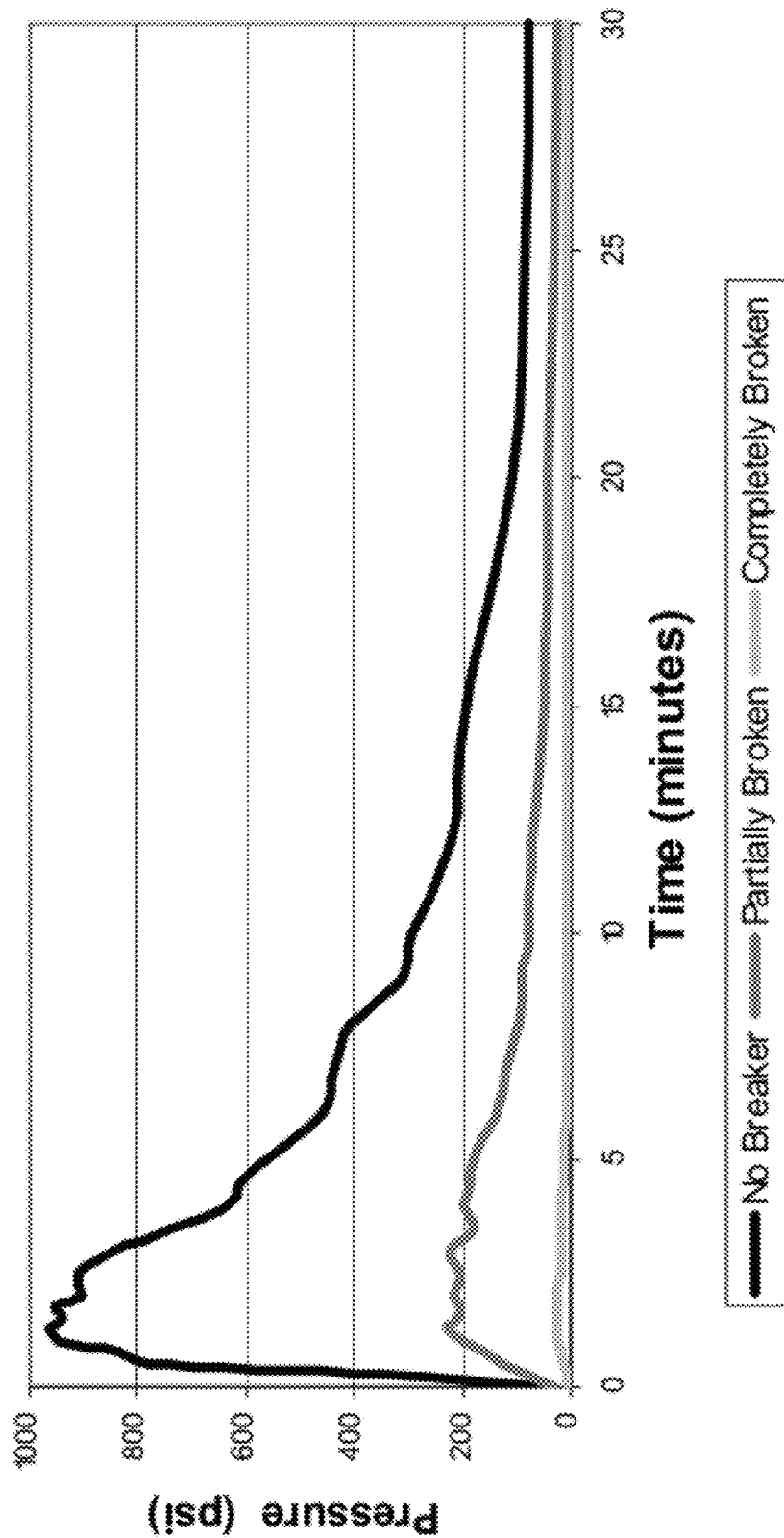
Figure 5:
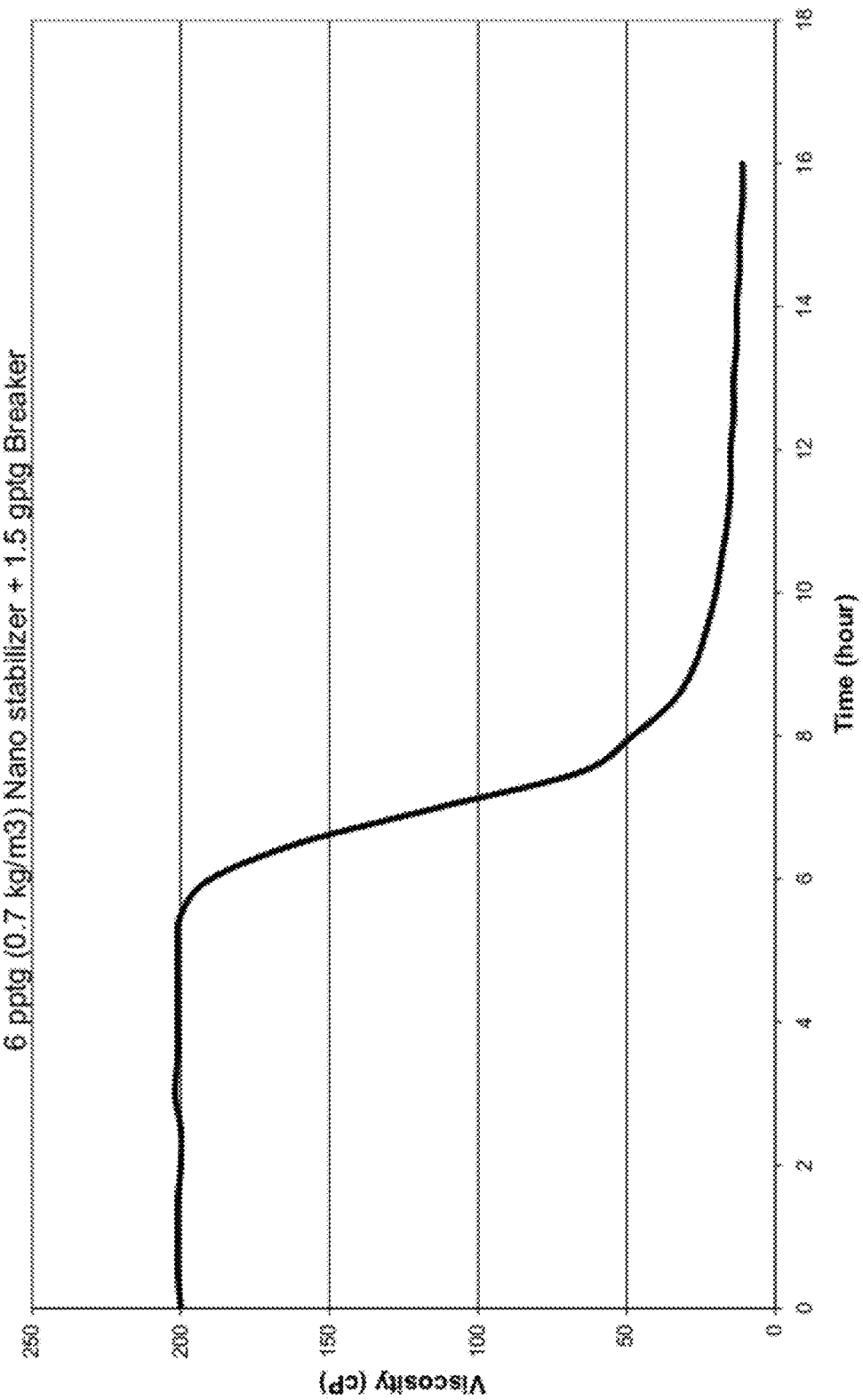
Figure 6:
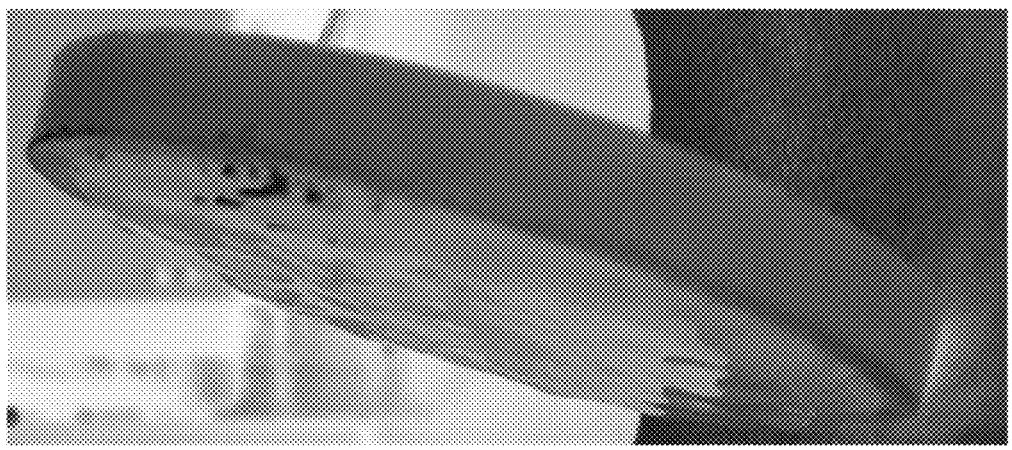

C.) without a breaker and then with 3.0 gptg fish oil breaker showing approximately 90% broken and 100% broken states;

FIG. 2 is a graph of the viscosity of VES gelled fluid as a function of time and shear rate, where the VES gelled fluid is a 13.0 ppg (1.6 kg/liter) $CaCl_2/CaBr_2$ brine with 4% VES at 150° F. (66° C.), with and without 6 pptg (0.7 kg/m$^3$) VE-42 FLC agent;

FIG. 3 is a graph of viscosity of the VES gelled fluid as a function of time and shear rate, where the VES gelled fluid is a 13.0 ppg (1.6 kg/L) $CaCl_2/CaBr_2$ with 4% VES at 250° F. (121° C.), with and without 6 pptg (0.7 kg/m$^3$) VE-41 FLC agent;

FIG. 4 is a graph of flowback pressure as a function of time for VES clean-up procedures in 1 inch×6 inch (2.5×15 cm) Berea cores without a viscosity enhancer, for a 3% KCl fluid with 4% VES with and without 3.0 gptg internal fish oil breaker;

FIG. 5 is a graph of viscosity over time for a 13.0 ppg (1.6 kg/L) $CaCl_2/–CaBr_2$ brine with 4% VES and 6 pptg (0.7 kg/m$^3$) VE-41 (nano-sized MgO FLC agent viscosity enhancing particles) and 1.5 gptg fish oil internal breaker at 250° F. (121° C.); and FIG. 6 is a photo of a fluid loss disc that shows a side view of the pseudo-filter cake that forms during VES fluid leak-off when using nano-sized fluid loss control agents within the VES at 250° F. (121° C.), where the fluid was 13.0 ppg (1.6 kg/L) brine, 4% VES, 6 pptg (0.7 kg/m$^3$) stabilizer, 1 gptg breaker, and 10 pptg (about 1.2 kg/m$^3$) nano-sized MgO (35 nm).

DETAILED DESCRIPTION

A new and robust VES fluid composition has been discovered that can now compete in controlling fluid loss like polymeric FLC pills but is significantly less damaging to hydrocarbon production than the latter can be. The new FLC pill is a VES-based system that is a unique and synergistic combination of VES micelle modifying agents that will allow VES to be used as a FLC pill. The new VES-based FLC pill is easier to remove and leaves much less formation, gravel, and proppant pack permeability damage as compared to polymeric FLC pills and offer several other benefits over polymeric-based FLC pills.

It has been discovered that the addition of alkaline earth metal oxides, such as magnesium oxide, and alkaline earth metal hydroxides, such as calcium hydroxide, to an aqueous fluid gelled with a VES improved the fluid loss of these brines. Transition metal oxides and transition metal hydroxides also may serve as FLC agents herein. The fluid loss control agents herein are believed to be particularly useful in VES FLC pills used for well completion or stimulation, such as LCM pills or kill pills. It is especially useful that the fluid loss control agents are slowly soluble which permits their removal from the formation to be easy and complete maintaining little or no damage to the formation. In particular, the VES-gelled aqueous fluids have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment up to about 300° F. (about 149° C.). Use of MgO and the like particles, as disclosed within U.S. Patent Application Publication 2005/0252658 A1 (Ser. No. 11/125,465, incorporated herein by reference in its entirety) is for high temperature stability of VES viscosity, and applies for temperature applications above about 190° F. (about 88° C.). The use of MgO and the like particles for the fluid loss control herein has application and functionality to much broader temperature range, such as from about 70° F. to about 400° F. (about 21° C. to about 204° C.), and may be used in low salinity monovalent brines, such as 3% KCl.

This discovery allows the VES system to have fluid loss control to help minimize formation damage during well completion operations. That is, the introduction of these additives to the VES-gelled aqueous system will limit and reduce the amount of VES fluid which leaks-off into the pores of a reservoir during a FLC treatment, thus minimizing the formation damage that may occur by the VES fluid within the reservoir pores. Also, limiting the amount of VES fluid that leaks-off into the reservoir during a treatment will allow more fluid to remain within the wellbore and thus less total fluid volume will be required for the treatment. Thus the use of these additives in a VES-gelled aqueous system will improve the performance of the VES fluid while lowering treatment cost.

Additionally, it has been surprisingly discovered that the range in reservoir permeability does not significantly control the rate of fluid leaked-off when the additives of this invention are within a VES fluid. Thus, the rate of leak-off in 2000 mD reservoirs will be comparable to the rate of leak-off in 100 and 400 mD reservoirs. This enhanced control in the amount of fluid leaked-off for higher permeability reservoirs also expands the range in reservoir permeability to which the VES fluid may be applied. The expanded permeability range may allow VES fluid to be used successfully within reservoirs with permeabilities as high as 2000 to 3000 or more millidarcies (mD). Prior VES-gelled aqueous fluids have reservoir permeability limitations of about 800 mD, and even then they result in 2- to 4-fold volume of VES fluid leak-off rate as compared with the fluid loss control achievable with the methods and compositions herein.

Prior art VES-gelled aqueous fluids, being non-wall-building fluids (i.e. there is no polymer or similar material build-up on the formation face to form a filter cake) that do not build a filter cake on the formation face, have viscosity controlled fluid leak-off into the reservoir. By contrast, the methods and compositions herein use a fluid loss agent that associates with the VES micelle structures through surface adsorption or/and particle surface charge attraction, allowing pseudo-crosslinking of the elongated micelles to occur, in one non-limiting explanation of the mechanisms at work herein. In one non-restrictive sense, the FLC agent "connects" or "networks" the micelles together. This unique association has been found to form a highly viscous layer of crosslinked-like VES fluid on the formation face, thus acting as a pseudo-filter cake layer that limits and controls additional VES fluid from leaking-off into the reservoir pores. The pseudo-filter cake is composed of VES micelles that have VES surfactants with very low molecular weights of less than 1000. This is in contrast to and different from polymeric fluids that form true polymer mass accumulation-type filter cakes by having very high molecular weight polymers (1 to 3 million molecular weight) that due to their size are not able to penetrate the reservoir pores, but bridge-off and restrict fluid flow in the pores.

The fluid loss agents herein associate with the VES micelles and as VES fluid is leaked-off into the reservoir a viscous layer of micelles and fluid loss control particles and/or ions accumulate on the formation face, thus reducing the rate of VES fluid leak-off. It has been discovered that particulate plugging of the reservoir pores is not the mechanism of leak-off control or the mechanism that allows development of the viscous micelle layer. Tests using nanometer-sized fluid loss agents (on the order of $10^{-9}$ to $10^{-8}$ meters), that have no potential to bridge or plug reservoir pores of 1 mD or higher reservoir permeability, still develop the viscous micelle layer.

These materials still have the same or similar leak-off control-rate profiles (i.e. rate of fluid leak-off over time) as the 1 to 5 micron size fluid loss control particles useful for this invention that are larger. Thus, the size of the fluid loss agent is not a controlling and/or primary factor of methods and compositions herein, that is, to control VES fluid leak-off rate. It is the formation of a viscous layer of VES micelles and fluid loss control agent that limits the rate of further VES fluid leak-off through the formation, even for nano size fluid loss control agents used within the VES-gelled aqueous fluid.

In the method herein, an aqueous FLC pill, as a non-limiting example, is first prepared by blending a VES into an aqueous fluid. The aqueous fluids gelled by the VESs herein may optionally be brines. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, for a non-limiting example.

In one non-limiting embodiment, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$, or NaCl, $CaCl_2$, and $CaBr_2$ as non-limiting examples.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEARFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SURFRAQ™ VES. SURFRAQ is a VES liquid product that is 50% TAPAO and 50% propylene glycol. These viscoelastic surfactants are capable of gelling aqueous solutions to form a gelled base fluid. The additives of this invention may also be used in DIAMOND FRAQ™ which is a VES system, similar to SURFRAQ, which contains VES breakers sold by Baker Oil Tools.

The amount of VES included in the FLC pill depends in part on generating, creating or producing enough viscosity to control the rate of fluid leak off into the pores of the formation, which is also dependent on the type and amount of FLC agent used. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the present invention is from about 1.0 to about 6.0% by volume VES product. In an alternate, non-restrictive form of the invention, the amount of VES ranges from 2 to about 10 volume %.

The fluid loss control agents useful herein include, but are not necessarily limited to, slowly soluble alkaline earth metal oxides or alkaline earth metal hydroxides, transition metal oxides, transition metal hydroxides, or mixtures thereof. In one non-limiting embodiment, the alkaline earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the transition metals such as copper, tin, nickel, and the like may be used in relatively low concentration compared to or in combination with the alkaline earth metals. In one non-restrictive embodiment, the amount of additive ranges from about 2 to about 200 pounds per thousand gallons (pptg) (about 0.2 to about 24 $kg/m^3$) based on the aqueous viscoelastic treating fluid. In another non-restrictive embodiment, the amount of additive may have a lower limit of about 6 pptg (about 0.7 $kg/m^3$) and independently an upper limit of about 80 pptg (about 9.6 $kg/m^3$), and in another non-restrictive version a lower limit of about 8 pptg (about 1 $kg/m^3$) and independently an upper limit of about 40 pptg (about 4.8 $kg/m^3$), and in still another non-limiting embodiment, a lower limit of about 10 pptg (about 1.2 $kg/m^3$) and independently an upper limit of about 25 pptg (about 3 $kg/m^3$).

The amount of transition metal oxides or transition metal hydroxides may range from about 0.0001 pptg (about 0.01 $g/m^3$) independently to an upper limit of about 40 pptg (about 4.5 $kg/m^3$), and in another non-restrictive version from about 0.1 pptg (about 12 $g/m^3$) independently up to about 0.5 pptg (about 60 $g/m^3$). In another non-limiting embodiment, the particle size of the FLC agents ranges between about 1 nanometer independently up to about 0.2 millimeter. In another non-limiting embodiment, the particle size of the FLC agents ranges between about 4 nanometer independently up to about 74 microns. The FLC agents may be added along with the VES fluids. In another non-restrictive version the FLC agents may have a surface area of between about 10 to about 700 square meter per gram ($m^2/g$).

It turns out that the particle size distribution of magnesium oxide (or other fluid loss control agent) is probably not a major factor for fluid loss control in VES-gelled fluids. In one non-limiting explanation, it appears that there may be two primary mechanisms that make magnesium oxides good candidate for FLC agents in VES-gelled fluids. The first mechanism involves surface adsorption formed with magnesium oxide (or other FLC agent) and the fatty amine found in the VES. The chemisorption formed with magnesium oxide particles associating with the long chain hydrocarbons will easily form a plug for a porous formation to control VES-gelled fluid loss. The second mechanism is that magnesium oxide molecular clusters may contain inherited structural defects to generate extra positive charges on the surface of the magnesium oxide molecular clusters. These positive charges will attract or connect to or associate with the anionic part in the micelle of VES-gelled fluids and form a larger particle that temporarily plugs the pore throats of porous formation to reduce the VES fluid loss. The chemisorption and/or surface charges of magnesium oxide particles associating with the micelles of VES-gelled fluids form a viscous layer or a pseudo-filter cake on the rock surface to block fluid flowing into the rock. Another advantage for magnesium oxide and the other agents being a good FLC agent in VES-gelled fluids is that they are slowly soluble compounds in these systems (e.g. solubility of MgO in water is less than 0.9 milligram per liter of water at ambient temperature), which means that after the VES-gelled fluid treatments, the magnesium oxide (e.g.) will be dissolved into VES-gelled fluids and/or the formation fluids and may be removed during production; therefore, minimizing formation damage that may occur as compared with other known fluid loss control additives or systems.

The solubility of the FLC agents is believed to be complex. For instance, the total amount of MgO particles solubilized may be from about 0.0001 to about 0.2 wt %, while the rest may remain as solid particles in a solubility equilibrium in the fluid, although the inventors do not wish to be limited to any particular explanation. The factors that may affect or control the solubility rate and total amount equilibrium include, but are not necessarily limited to, chemical composition, chemical structure, particle or aggregate structure, particle size, hard versus light burns in manufacturing (i.e. degree and duration of heating), fluid salinity, and fluid temperature. In some cases, the compounds may remain as solid particles or at least particles much longer, such as special nano-sized MgO particles with unique crystal compound and aggregate structures. These may be much less soluble and would dissolve at relatively slower rates. Other MgO and nano MgO particles may be faster to dissolve and more total amount will be solubilized; thus there may be a very broad range in rate and amount of solubility. In one non-limiting embodiment, an estimate may be that for some MgO products a small portion (about 0.005 to about 0.02 wt %) will solubilize within 1 to 2 minutes (for instance, it has been noticed the water pH increases quickly upon MgO addition) with then another portion continuing to be solubilized until a solubility equilibrium is apparently reached in about 2 to 8 hours. In some non-restrictive versions, the total amount solubilized may be from about 0.1 to about 2.0 wt %. The rate and amount of solubility within mid- to high-salinity fluids may thus be rather complex, for example in one non-limiting explanation it may be that overall a lower solubility rate and amount occurs in saline fluids, e.g. about 11.0 ppg (about 1.3 kg/liter) $CaCl_2$ and about 14.0 ppg (about 1.7 kg/liter) $CaBr_2$. With increasing fluid temperature it may be that the solubility rate increases and the solubility equilibrium is shifted to where more total amount may be solubilized, such as at a fluid temperature of about 250° F. (about 121° C.).

There has evolved in the stimulation fluid art an industry standard need for "controllable gel break", but for VES-gelled fluids this has been a substantially challenging problem. There needs to be a method for breaking VES-gelled fluids that can be as easy, as controllable, and as economic as breaking conventional polymeric fluids, preferably using an internal breaker. At the same time, it is not desirable to reduce the viscosity of the fluid, i.e. break the gel, immediately or essentially instantaneously. Additionally, of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow controllable breaks over time, such as within 1 to about 288 hours. In another non-limiting embodiment the break for the FLC pill occurs within about 8 to about 144 hours; alternatively from about 12 to about 96 hours, and in another non-restrictive version about 24 to about 72 hours. Preferably, the FLC pill will retain most if not all of its initial fluid viscosity over a prescribed amount of time before the internal breaker substantially lowers or completely breaks the fluid viscosity. In some cases a second pill may be used after the first has been in place for a period of time where additional or extended fluid loss control time is required. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components may be used separately, if needed, as an external breaker solution to remove VES gelled fluids already placed downhole. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed macro- and/or microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Surprisingly and unexpectedly the method may employ one or more mineral oils (as a non-limiting example of a suitable breaker) as the breaking component. This is surprising because the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It is important to add the lower molecular weight mineral oils after the VES product is added to the aqueous fluid. However, for higher molecular weight mineral oils, types like GLORIA® and HYDROBRITE® 200 from Crompton Corporation and PURE PERFORMANCE® Base Oils 225N and 600N from ConocoPhillips Company, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, PURE PERFORMANCE® and ULTRA-S™ from ConocoPhillips Company, ESCAID®, EXXSOL®, ISOPAR® and the like mineral oils available from ExxonMobil Chemical, and similar products from other mineral oil manufacturers. The ESCAID 110® and Conoco LVT-200® mineral oils have been well known components of oil-based drilling muds and the oil industry has considerable experience with these products, thus making them attractive choices. The mineral oils from ConocoPhillips Company with their high purity and high volume use within other industries are also an attractive choice.

It has been discovered in breaking VES-gelled fluids prepared in mono-valent brines (such as 3% KCl brine) that at temperatures below about 160° F. (71° C.) EXXSOL® D80 works well in breaking VES-gelled fluids, and that at or above about 140° F. (60° C.) Pure Performance® 225N works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, ESCAID® 110 at 5.0 gptg will readily break the 3 wt % KCL based VES fluid at 100° F. (38° C.) over a 5 hour period. ESCAID® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found in U.S. patent application Ser. No. 11/517,688 filed Sep. 8, 2006, published as U.S. Patent Application Publication No. 2007/0056737, incorporated by reference herein in its entirety.

In one non-limiting embodiment these gel-breaking products or breakers work by rearrangement of the VES micelles from rod-shaped or worm-shaped elongated structures to give spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-restrictive version these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction may be triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no reheating is expected. The effective amount of mineral oil, plant oil and/or fish oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000\,m^3$, etc.)

Controlled viscosity reduction rates can be achieved at a temperature of from about 60° F. to about 400° F. (about 16 to about 204° C.), and alternatively at a temperature of from about 80° F. independently to an upper end of the range of about 280° F. (about 27 to about 138° C.), and in another non-limiting embodiment independently up to about 300° F. (149° C.). In one non-limiting embodiment, the fluid designer would craft the fluid system in such a way that the VES gel would break at or near the formation temperature after FLC pill function was accomplished.

In one non-limiting embodiment, fluid internal breaker design would be based primarily on formation temperature, i.e. the temperature the fluid will be heated to naturally in the formation once FLC pill has been spotted downhole. Fluid design may take into account the expected duration or exposure of the fluid at formation temperature during a LCM pill treatment. There would generally be no additional temperature or heating the VES FLC pill would see or experience other than original reservoir temperature.

In another non-limiting example, a combination of internal breakers may have synergistic results, that is, the breaking profile of the fluid over time is improved when two types of internal breakers are used rather only one or the other. The use of mineral oil alone, like the use of metal enhanced polyenoic breaker alone, does not give the rate and degree of viscosity reduction over time as does the combination of mineral oil with metal enhanced polyenoic breaker. By using combinations of internal breakers, both the initial and final break of the VES fluid may be customized, that is, have improved overall breaking performance. In other words, one breaker mechanism may help speed up another breaker mechanism. Surprisingly, even with two internal breaker mechanisms present in the VES fluid, the novel pseudo-filter cake with fluid loss control agent may still shows excellent fluid loss control.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid; the starting pH of the fluid; and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective herein may range from about 5 to about 25,000 ppm, based on the total amount of the fluid. In another non-restrictive version herein, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkaline earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4N$, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based fluids herein. The breaking systems herein may be particularly useful for breaking loss circulation pill fluids, fluid loss pills and kill pills composed of VES. The breaker system may additionally work for foamed fluid applications (hydraulic fracturing, acidizing, and the like), where $N_2$ or $CO_2$ gas is used for the gas phase. The VES breaking methods herein are a significant improvement in that it gives breaking rates for VES based fluids that the industry is accustomed to with conventional polymer based fluids, such as borate crosslinked guar and linear HEC (hydroxyethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after a treatment.

In one non-limiting embodiment, the compositions herein will degrade the gel created by a VES in an aqueous fluid, by disaggregation or rearrangement of the VES micellar structure. However, the inventors do necessarily not want to be limited to any particular mechanism. Also, in another non-restrictive version, the only component present in the VES gelled aqueous fluid that reduces viscosity is one of the internal breakers described herein, or mixtures thereof. Alternatively, a separately introduced external breaker component introduced after the VES-gelled pill may be used (e.g. various separately added clean-up fluids). However, conditions (such as elevated temperature) and already existing chemicals (reservoir hydrocarbons) may be present when and where the internal breakers are included, either intentionally or incidentally.

The base fluid for the pills herein may also contain other conventional additives common to the well service industry such as water wetting surfactants, non-emulsifiers and the like. In a non-restrictive embodiment herein, the treatment fluid may contain other viscosifying agents, other different surfactants, clay stabilization additives, scale dissolvers, biopolymer degradation additives, and other common and/or optional components.

In a particularly useful embodiment herein, employing pills with internal VES breakers may have synergistic clean-up effects for the fluid loss control agent and the VES fluid. Use of these methods and compositions with an internal breaker may allow less VES fluid to leak-off into the reservoir, thus resulting in less fluid needed to be broken and removed once the treatment is over. Additionally, use of an internal breaker within the VES micelles may further enhance the breaking and removal of the pseudo-filter cake viscous VES layer that develops on the formation face with the fluid loss agents of this invention. Lab tests to date appear to show that the viscous VES pseudo-filter cake has the micelles readily broken down to the relatively non-viscous, more spherically-shaped micelles by use of an internal breaker, and also with use of encapsulated breaker, if used.

The viscoelastic surfactant gelled fluids herein may optionally contain at least one viscosity enhancer. The viscosity enhancers herein also aid with fluid loss control. Suitable viscosity enhancers include, but are not limited to, pyroelectric particles, piezoelectric particles, and mixtures thereof. Details about the use of pyroelectric and piezoelectric particles may be found in U.S. patent application Ser. No. 11/608,035, published as U.S. Patent Application Publication No. 2008/0139419, incorporated by reference herein in its entirety. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains, but the way the viscosity enhancers associate or interact or interconnect the elongated or "worm-like" VES micelles is believed to be completely different.

Suitable viscosity enhancers include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of the viscosity enhancer ranges from about 0.1 to about 500 pptg (about 0.012 to about 60 kg/m³) based on the total aqueous viscoelastic treating fluid.

The invention will be further described with respect to the following Examples which are not meant to limit the invention, but rather to further illustrate the various embodiments.

EXAMPLE 1

Figure 1:
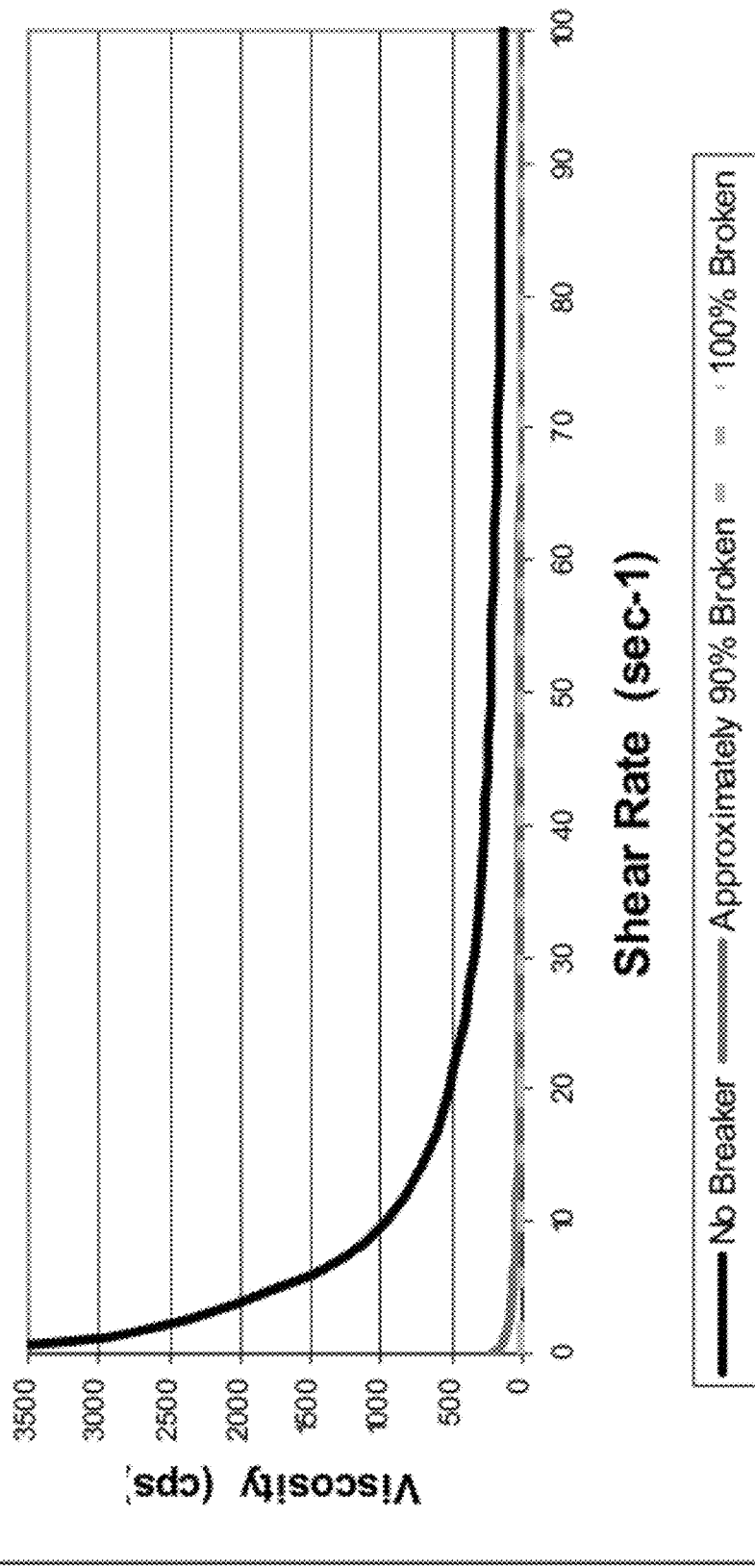
FIG. 1 is a graph of viscosity as a function of shear rate for tests with a 7% KCl brine fluid having 4% VES at 150° F. (66°

FIG. 1 is a graph of viscosity as a function of shear rate for tests with a 7% KCl brine fluid having 4% VES at 150° F. (66° C.) without a breaker and then with 3.0 gptg fish oil breaker showing approximately 90% broken and 100% broken states. It may thus be seen that fish oil may be an effective and complete internal breaker for use in fluid loss pills and the like.

EXAMPLE 2

FIG. 2 is a graph of the viscosity of VES gelled fluid as a function of time and shear rate, where the VES gelled fluid is a 13.0 ppg (1.6 kg/L) $CaCl_2$/$CaBr_2$ brine with 4% VES at 150° F. (66° C.), with and without 6 pptg (0.7 kg/m³) VE-42. VE-42 is a nano-sized ZnO FLC agent and viscosity enhancing particle product available from Baker Oil Tools. FIG. 2 demonstrates that the fluid with 6 pptg (0.7 kg/m³) VE-42 particles has increased viscosity, particularly at the shear rates indicated.

EXAMPLE 3

FIG. 3 is a graph of viscosity of the VES gelled fluid as a function of time and shear rate, where the VES gelled fluid is a 13.0 ppg (1.6 kg/L) $CaCl_2$/$CaBr_2$ brine with 4% VES at 250° F. (121° C.), with and without 6 pptg (0.7 kg/m³) VE-41. VE-41 is a nano-sized MgO FLC agent and viscosity enhancing particle product available from Baker Oil Tools. FIG. 3 demonstrates that the fluid with 6 pptg (0.7 kg/m³) VE-41 particles also has increased viscosity, particularly at the shear rates indicated.

EXAMPLE 4

FIG. 4 is a graph of flowback pressure as a function of time for VES clean-up procedures in 1 inch×6 inch (2.5×15 cm) Berea cores without a viscosity enhancer, for a 3% KCl fluid with 4% VES with and without 3.0 gptg internal fish oil breaker. The partially broken curve is from using 3.0 gptg fish oil shut in core at 150° F. (66° C.) for 4 hours to simulate a partial VES break and the completely broken curve is from using 3.0 gptg fish oil shut in core at 150° F. (66° C.) for 4 hours to simulate a complete VES break. This Example further demonstrates the effectiveness of the internal breakers herein.

EXAMPLE 5

FIG. 5 is a graph of viscosity over time for a 13.0 ppg (1.6 kg/L) $CaCl_2$/$CaBr_2$ brine with 4% VES and 6 pptg (0.7 kg/m³) VE-41 (nano-sized MgO FLC agent and viscosity enhancing particles) and 1.5 gptg fish oil internal breaker at 250° F. (121° C.). This graph shows how the internal breaker works fine with the viscosity enhancer present in the fluid.

EXAMPLE 6

FIG. 6 is a photo of a fluid loss disc that shows a side view of the pseudo-filter cake that forms during VES fluid leak-off when using nano-sized fluid loss control agents within the VES at 250° F. (121° C.), where the fluid was 13.0 ppg (1.6 kg/L) brine, 4% VES, 6 pptg (0.7 kg/m³) stabilizer, 1 gptg breaker, and 10 pptg (about 1.2 kg/m³) nano-sized MgO (35 nm). This photograph visually demonstrates that a suitable pseudo-filter cake structure may be formed with the FLC pills herein.

As used herein, the word "comprising" as used throughout the claims is to be interpreted to mean "including but not limited to".

In the foregoing specification, the invention has been described with reference to specific embodiments thereof, and has been demonstrated as effective in inhibiting fluid loss for surfactant gelled fluids in fluid loss control pills. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, fluid loss control agents (e.g. alkaline earth metal oxides, alkaline earth metal hydroxides, transition metal oxides, transition metal hydroxides, and combinations thereof), internal breakers, viscosity enhancers, and other components falling within the claimed parameters, but not specifically identified or tried in a particular composition, are anticipated to be within the scope of this invention.

What is claimed is:

1. A method for controlling fluid loss in a well comprising:
    injecting an aqueous fluid loss control (FLC) kill pill through a wellbore and to a subterranean formation where the aqueous FLC kill pill comprises:
        an aqueous base fluid;
        a viscoelastic surfactant (VES) gelling agent in an amount effective to increase the viscosity of the aqueous base fluid;
        an amount of a fluid loss control (FLC) agent effective to improve the fluid loss as compared with an identical fluid absent the FLC agent, where the FLC agent is a particle having an average particle size ranging from about 1 nanometer to about 10 microns and where the agent is selected from the group consisting of alkaline earth metal oxides, alkaline earth metal hydroxides, transition metal oxides, transition metal hydroxides, and mixtures thereof; and
        an internal breaker selected from the group consisting of transition metal ion sources, saponified fatty acids, mineral oils, hydrogenated polyalphaolefin oils, saturated fatty acids, unsaturated fatty acids, and combinations thereof; wherein the internal breaker is present in an amount of from about 5 to about 25,000 ppm;
            where in the case the FLC agent is selected from the group consisting of alkaline earth metal oxides, alkaline earth metal hydroxides and mixtures thereof, the effective amount of the FLC agent ranges from about 2 to about 200 pptg (about 0.2 to about 24 kg/m$^3$) and the internal breaker is selected from the group consisting of transition metal ion sources, saponified fatty acids, mineral oils, hydrogenated polyalphaolefin oils, saturated fatty acids, unsaturated fatty acids, and combinations thereof, and
            where in the case the FLC agent is selected from the group consisting of transition metal oxides, transition metal hydroxides, and mixtures thereof, the effective amount of the FLC agent ranges from about 0.0001 pptg to about 40 pptg (from about 0.01 g/m$^3$ to about 4.5 kg/m$^3$) and the internal breaker is selected from the group consisting of transition metal ion sources, saponified fatty acids, hydrogenated polyalphaolefin oils, saturated fatty acids, unsaturated fatty acids, and combinations thereof;
    reducing the flow of fluids into the wellbore; and
    improving fluid loss into the formation as compared with an identical fluid absent the FLC agent,
    where all proportions are based on the aqueous FLC kill pill.

2. The method of claim 1 where the aqueous base fluid is brine.

3. The method of claim 1 where in the FLC agent, the alkaline earth metal in the alkaline earth metal oxides and/or alkaline earth metal hydroxides is selected from the group consisting of magnesium, calcium, strontium, barium and mixtures thereof.

4. The method of claim 1 where in the FLC agent, the transition metal in the transition metal oxides and/or transition metal hydroxides is selected from the group consisting of aluminum, zirconium, vanadium, molybdenum, manganese, iron, cobalt, nickel, palladium, copper, zinc, tin, antimony, titanium and combinations thereof.

5. The method of claim 1 where the aqueous FLC pill is exposed to a temperature of from about 60° F. to about 400° F. (about 16 to about 204° C.).

6. The method of claim 1 where the aqueous FLC pill further comprises at least one viscosity enhancer selected from the group consisting of pyroelectric particles, piezoelectric particles, and mixtures thereof.

7. A method for controlling fluid loss in a well comprising:
    injecting an aqueous fluid loss control (FLC) kill pill through a wellbore and to a subterranean formation where the aqueous FLC kill pill comprises:
        an aqueous base fluid;
        a viscoelastic surfactant (VES) gelling agent in an amount effective to increase the viscosity of the aqueous base fluid;
        from about 2 to about 200 pptg (about 0.2 to about 24 kg/m$^3$) of a fluid loss control (FLC) agent effective to improve the fluid loss as compared with an identical fluid absent the FLC agent, where the FLC agent is a particle having an average particle size ranging from about 1 nanometer to about 10 microns and where the agent is selected from the group consisting of alkaline earth metal oxides, alkaline earth metal hydroxides, and mixtures thereof; and
        an internal breaker selected from the group consisting of transition metal ion sources, saponified fatty acids, mineral oils, hydrogenated polyalphaolefin oils, saturated fatty acids, unsaturated fatty acids, and combinations thereof; wherein the internal breaker is present in an amount of from about 5 to about 25,000 ppm;
    reducing the flow of fluids into the wellbore; and
    improving fluid loss into the formation as compared with an identical fluid absent the FLC agent,
    where all proportions are based on the aqueous FLC kill pill.

8. The method of claim 7 where the aqueous base fluid is brine.

9. The method of claim 7 where in the FLC agent, the alkaline earth metal in the alkaline earth metal oxides and/or alkaline earth metal hydroxides is selected from the group consisting of magnesium, calcium, strontium, barium and mixtures thereof.

10. The method of claim 7 where the aqueous FLC pill is exposed to a temperature of from about 60° F. to about 400° F. (about 16 to about 204° C.).

11. The method of claim 7 where the aqueous FLC pill further comprises at least one viscosity enhancer selected from the group consisting of pyroelectric particles, piezoelectric particles, and mixtures thereof.

12. A method for controlling fluid loss in a well comprising:
  injecting an aqueous fluid loss control (FLC) kill pill through a wellbore and to a subterranean formation where the aqueous FLC kill pill comprises:
    an aqueous base fluid;
    a viscoelastic surfactant (VES) gelling agent in an amount effective to increase the viscosity of the aqueous base fluid;
    from about 0.0001 pptg to about 40 pptg (from about 0.01 g/m$^3$ to about 4.5 kg/m$^3$) of an amount of a fluid loss control (FLC) agent effective to improve the fluid loss as compared with an identical fluid absent the FLC agent, where the FLC agent is a particle having an average particle size ranging from about 1 nanometer to about 10 microns and where the agent is selected from the group consisting of transition metal oxides, transition metal hydroxides, and mixtures thereof; and
    an internal breaker selected from the group consisting of transition metal ion sources, saponified fatty acids, hydrogenated polyalphaolefin oils, saturated fatty acids, unsaturated fatty acids, and combinations thereof; wherein the internal breaker is present in an amount of from about 5 to about 25,000 ppm;
  reducing the flow of fluids into the wellbore; and
  improving fluid loss into the formation as compared with an identical fluid absent the FLC agent,
  where all proportions are based on the aqueous FLC kill pill.

13. The method of claim 12 where the aqueous base fluid is brine.

14. The method of claim 12 where in the FLC agent, the transition metal in the transition metal oxides and/or transition metal hydroxides is selected from the group consisting of aluminum, zirconium, vanadium, molybdenum, manganese, iron, cobalt, nickel, palladium, copper, zinc, tin, antimony, titanium and combinations thereof.

15. The method of claim 12 where the aqueous FLC pill is exposed to a temperature of from about 60° F. to about 400° F. (about 16 to about 204° C.).

16. The method of claim 12 where the aqueous FLC pill further comprises at least one viscosity enhancer selected from the group consisting of pyroelectric particles, piezoelectric particles, and mixtures thereof.

* * * * *